Oct. 2, 1956  M. STENGER  2,765,060
DISK CLUTCH

Filed July 29, 1952.  2 Sheets-Sheet 1

INVENTOR
MAXIMILIEN STENGER
BY Robert E. Burns
ATTORNEY

Oct. 2, 1956  M. STENGER  2,765,060
DISK CLUTCH

Filed July 29, 1952  2 Sheets-Sheet 2

INVENTOR.
MAXIMILIEN STENGER
BY Robert E. Burns
ATTORNEY

United States Patent Office 2,765,060
Patented Oct. 2, 1956

2,765,060

DISK CLUTCH

Maximilien Stenger, Paris, France, assignor to Societe Anonyme Francaise du "Ferodo," Paris (Seine), France Application July 29, 1952, Serial No. 301,497

Claims priority, application France August 3, 1951

2 Claims. (Cl. 192—68)

This invention relates to a disk clutch the essential features of which are its extreme simplicity, its low weight and cost price and the fact that it can withstand very high velocities of rotation.

This clutch is characterized in that a cover is fixed on a driving member and in that there are arranged in this cover one or more friction disks connected to a driven member and normally urged by spring means for engagement with the driving portion of the arrangement. The action exerted by these spring means can be neutralized by acting on clutch disengaging levers. These levers are so designed as to combine a high mechanical resistance with a relatively great simplicity. These levers are pivoted on pins journaled on the one hand in the pressure plate acting on the friction disks and on the other hand in links connected to the cover through eccentric pins whereby the clutch can be adjusted.

Another specific feature of the clutch according to this invention is that the rotational force required for the pressure plate is transmitted through very thin plates which, due to their great flexibility, exert no detrimental influence on the drive, irrespective of the axial position of the pressure plate relative to the fly-wheel, as this position varies with the degree of wear of the friction disks.

The arrangement of the various component members is such that the detrimental influence exerted by the centrifugal force on existing clutches is definitely suppressed in this apparatus; whatever the velocity of rotation, there is no risk of displacement of any one of the members concerned. Another advantage is that the essential components of the clutch according to this invention are made of steel plate, so that in spite of its low weight the clutch offers a high mechanical resistance and can be manufactured at relatively low cost.

The accompanying drawings forming part of this specification illustrate diagrammatically by way of example one form of embodiment of a clutch for automotive vehicle.

Figure 1:
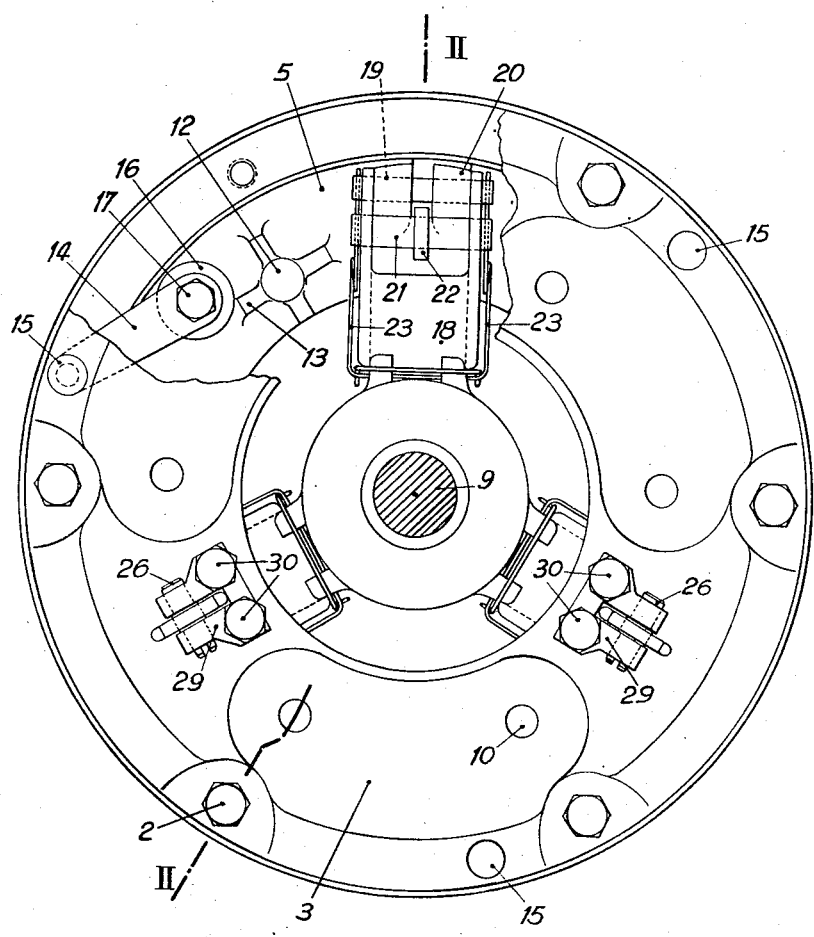
Fig. 1 is an elevational front view of the clutch from which the cover member is partly broken away.
Figure 2:
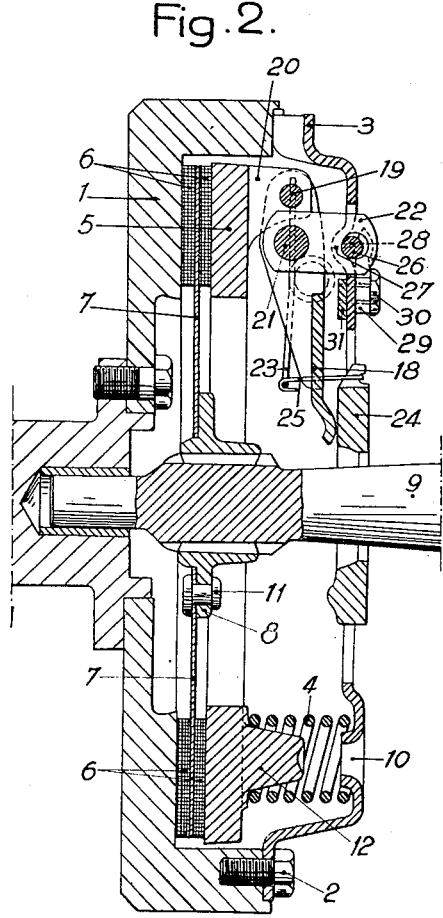
Fig. 2 is a sectional view according to the line II—II of Fig. 1.

The clutch cover 3 is secured to the flywheel 1 through screws 2. This cover is a steel plate pressing on which the clutch springs 4 are caused to bear when they transmit their pressure to the pressure plate 5 made of special friction cast iron. This plate 5 presses the friction disk against the flywheel 1. The friction disk consists of rings 6 made of an adequate friction material fastened to the disk 7 fixed in turn through rivets 11 to the hub member 8 slidably mounted on but rotatably fast with a splined shaft 9 so as to rotate same when the clutch is engaged.

The springs 4 are centered on the one hand by means of pressed collar portions 10 projecting inward of the cover 3, and on the other hand, by bosses 12 formed on the output side of the pressure plate 5, these bosses contributing in dynamically balancing the mechanism. In order to improve the cooling of these springs through air circulation they bear on four narrow ribs 13 at the base of bosses 12.

The pressure plate 5 is driven by a set of small plates 14 fastened on the one hand to cover 3 by means of rivets 15 and on the other hand to pressure plate 5 formed with bosses 16 by means of screws 17.

The declutching mechanism consists of sheet-metal levers 18 on which are mounted pivot pins 19 journaled in lugs 20 formed in the pressure plates and pivot pins 21 receiving the links 22. These pins 19 and 21 are held against motion by means of springs 23 adapted at the same time to maintain in position, through suitable strap members 25, the clutch release or thrust ring 24. The clutch release operation is effected by acting on this thrust ring 24 to which the operative stress is transmitted through a graphite thrust ring or ball thrust bearing (not shown).

Figure 5:
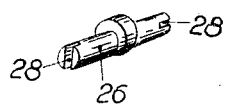
Fig. 5 is a perspective view showing the eccentric adjustment pin.

Links 22 are pivoted on pins 26 on which the levers are caused to bear as shown. To provide for adjustment, the link-engaging portions of pins 26 are eccentric in relation to the journal ends (see Fig. 5) thereof, the latter engaging suitably pressed portions 27 of the cover; end notches 28 are provided in these journal ends so that these eccentric pins can easily be adjusted by means of a screw driver.

When this adjustment has been made the pivot pins 26 can be locked in position by means of plates 29 fixed by screws 30 in the cover 3 suitably reinforced at these places by means of small arc-welded plates 31.

Figure 4:
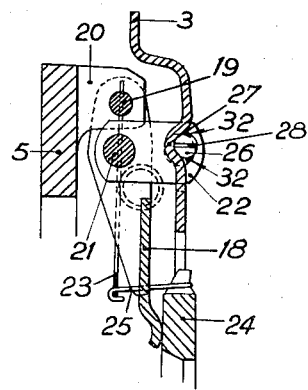
Fig. 4 shows another detail in connection with a modified embodiment of the invention.
Figure 3:
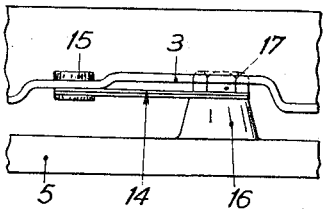
Fig. 3 is a detail view showing the plate driving device.

Figure 4 shows another manner in which the pivot pin 26 can be locked; it is advantageous in that it is much simpler but any subsequent adjustment cannot be made therewith; the pin is held against motion in a pressed portion 27 by spot welding as at 32.

The above-described apparatus operates very simply as follows:

When the clutch is engaged the friction disk is driven by the clamping action produced by the pressure springs, the pressure plate being rotatably driven by the small plates 14.

When the clutch is disengaged the friction disk is released and plate 5 is moved axially away by lugs 20 through the action of the clutch control member (not shown) the thrust of which is transmitted via the release ring 24 to the levers 18 pivoted on pins 21. These levers bear in turn on the cover through link 22 and eccentric pin 26.

As no slack motion is left in these pivotal mountings the levers cannot move under the centrifugal force developed during operation.

Of course, various modifications may be brought to this device, which is merely shown and described for illustrative purpose. Thus, the shape and mounting of the various components may be varied. Notably, the shape of the sheet-metal levers 18 may be changed in different manners. The same applies to the link-pin adjusting and locking arrangements, of which many different embodiments may be imagined by anybody conversant with the art. Obviously, all these modifications and other of similar or different order can be made without departing from the spirit and scope of the invention.

What I claim is:

1. A disk clutch intended more particularly for high velocities of rotation due to its compactness and the low inertia of the components of its mechanism, comprising a driving member, such as a flywheel, a driven splined shaft, coaxial with said flywheel, at least one friction ring disk slidably mounted on said shaft, a cover plate fastened to the periphery of said flywheel and surrounding the assembly consisting of said driving member, driven shaft and disk, an annular pressure plate coaxial with said driving and driven members, means connecting the pressure plate and cover plate for rotation in unison and for relative axial shift, springs bearing with one end against the inner face of the cover plate and with the other end against the pressure plate for clamping the disk between the flywheel and the pressure plate and a clutch mechanism consisting of a clutch release ring concentric with the driven shaft and elements for displacing the pressure plate through the clutch release ring, against the resistance of the springs, each of said elements comprising a link pivoted at one end on the outer face of the cover plate, a pin carried by the other end of said link, another pin parallel to said pin and carried by the pressure plate and a radial lever pivoted on each of said pins, having a free end in front of the clutch release ring and releasing the clutch when said clutch release ring is pushed against said free end of the radial lever, a resilient double-bend spring having two parallel arm portions extending along opposite sides of the lever and passing through holes in the pins to secure the lever to the pins and a transverse portion interconnecting radially inner end portions of said two parallel arm portions and means connecting said transverse portion with said ring to hold said ring against the free end of the lever.

2. A disk clutch intended more particularly for high speeds of rotation due to its compactness and resistance to centrifugal force, comprising a driving member having a friction driving face, a driven shaft coaxial with said driving member, an annular pressure plate surrounding and coaxial with said driven shaft, at least one annular friction disk rotatable with and movable axially of said shaft and disposed between said pressure plate and driving face, a cover plate secured at its periphery to said driving member and surrounding the assembly consisting of said driven shaft, pressure plate and disk, means connecting said pressure plate and cover plate for rotation in unison and relative axial movement, compression springs bearing at one end on the inner face of the cover plate and at the other end against the pressure plate to urge the pressure plate toward the driving member and thereby clamp said disk between the driving member and pressure plate, and clutch releasing mechanism comprising a clutch release ring coaxial with the driven shaft and movable axially and elements actuated by axial movement of said ring to move said pressure plate away from said driven member against the resistance of said springs and thereby release the clutch, each of said elements comprising a radially extending lever having a transverse circular hole in its outer end portion, a first pivot pin carried by the pressure plate with its axis extending transversely of said lever and fixed relative to said plate, said pin extending through said hole in the outer end portion of said lever to mount the lever pivotally on said plate for rotary movement about said fixed axis without translational movement, a swingable link extending through an aperture in said cover and having transverse circular holes in its inner and outer end portions, a second pivot pin carried by said lever and disposed parallel to and spaced from said first pin with its axis fixed relative to said lever, said second pin extending through said hole in the inner end portion of said link to connect said link pivotally to said lever for relative rotary movement without relative translational movement, a third pivot pin seated in depressions on the outer face of said cover plate and disposed parallel to said first pin with its axis fixed relative to said cover, said third pin extending through said hole in the outer end portion of said link to connect said link pivotally to said cover for relative rotary movement without relative translational movement, said link being swingable about the axis of said third pin without restriction other than by its pivotal connection by said second pin to said lever, the axes of said first and second pins lying approximately in the same radial plane and the pivotal connections provided by said pins holding said lever and link firmly against centrifugal force, the inner ends of said lever being engageable by said ring to swing said levers to disengage the clutch.

References Cited in the file of this patent

UNITED STATES PATENTS

| | | |
|---|---|---|
| 481,794 | Kershaw | Aug. 30, 1892 |
| 1,703,650 | Whitacre et al. | Feb. 26, 1929 |
| 1,882,897 | Reed | Oct. 18, 1932 |
| 2,164,544 | Reed | July 4, 1939 |
| 2,206,988 | Wemp | July 9, 1940 |
| 2,270,467 | Nutt | Jan. 20, 1942 |
| 2,290,513 | Wemp | July 21, 1942 |
| 2,453,344 | Root | Nov. 9, 1948 |

FOREIGN PATENTS

| | | |
|---|---|---|
| 762,278 | France | Jan. 18, 1934 |